United States Patent
Yamakawa et al.

(10) Patent No.: US 12,454,014 B1
(45) Date of Patent: Oct. 28, 2025

(54) CEMENTED CARBIDE AND CUTTING TOOL

(71) Applicant: SUMITOMO ELECTRIC HARDMETAL CORP., Itami (JP)

(72) Inventors: Takahiro Yamakawa, Itami (JP); Takato Yamanishi, Itami (JP); Masahito Hikiji, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 19/100,942

(22) PCT Filed: Jun. 18, 2024

(86) PCT No.: PCT/JP2024/022000
§ 371 (c)(1),
(2) Date: Feb. 4, 2025

(51) Int. Cl.
*B23B 27/14* (2006.01)
*C22C 29/08* (2006.01)

(52) U.S. Cl.
CPC ............ *B23B 27/148* (2013.01); *C22C 29/08* (2013.01); *B23B 2222/28* (2013.01); *B23B 2222/92* (2013.01)

(58) Field of Classification Search
CPC . B23B 27/48; B23B 2222/28; B23B 2222/92; C22C 29/08
See application file for complete search history.

(56) References Cited

U.S. PATENT DOCUMENTS

| | | | | |
|---|---|---|---|---|
| 5,181,953 | A * | 1/1993 | Nakano | C22C 29/08 75/242 |
| 2006/0051618 | A1 * | 3/2006 | Festeau | B23B 27/148 204/192.15 |
| 2012/0177453 | A1 * | 7/2012 | Konyashin | C22C 29/08 407/119 |

FOREIGN PATENT DOCUMENTS

| | | |
|---|---|---|
| JP | H06-093367 A | 4/1994 |
| JP | 2003-105477 A | 4/2003 |
| JP | 2008-069420 A | 3/2008 |

(Continued)

OTHER PUBLICATIONS

Written Opinion mailed on Sep. 3, 2024, received for PCT Application PCT/JP2024/022000, filed on Jun. 18, 2024, 6 pages including English Translation.

*Primary Examiner* — Alexandra M Moore
(74) *Attorney, Agent, or Firm* — XSENSUS LLP

(57) ABSTRACT

A cemented carbide includes 65 to 85 volume % of a first phase and 4 to 25 volume % of a second phase, wherein the first phase consists of carbide grains, the second phase includes 50 mass % or more of cobalt, the second phase includes zirconium, a cobalt content ratio $M_{Co}$ of the cemented carbide is 3 to 15 mass %, a and b of the cemented carbide indicate a relation of the following formula I:

$$b < 0.0485a + 0.0001 \qquad \text{I, where}$$

a represents a percentage, $(M_{Zr}/M_{Co}) \times 100$, of a zirconium content ratio $M_{Zr}$ in mass % with respect to the cobalt content ratio $M_{Co}$ in mass %, a is more than 0 and 8 or less, b represents an area percentage of pore in a first region of the cemented carbide, and the first region is a region located within a distance of 50 μm from a surface of the cemented carbide in the cross section.

6 Claims, 2 Drawing Sheets

(56) References Cited

FOREIGN PATENT DOCUMENTS

| JP | 2021-155778 A | 10/2021 |
| JP | 2022-136020 A | 9/2022 |

\* cited by examiner

CEMENTED CARBIDE AND CUTTING TOOL

CROSS-REFERENCE TO RELATED APPLICATION

This application is a national stage application, pursuant to 35 U.S.C. § 371, of International Patent Application No. PCT/JP2024/022000, filed Jun. 18, 2024, the entire contents of which are incorporated herein by reference.

TECHNICAL FIELD

The present disclosure relates to a cemented carbide and a cutting tool.

BACKGROUND ART

Conventionally, a cemented carbide including a hard phase having tungsten carbide (WC) as a main component and a binder phase having an iron group element as a main component has been used as a material of a cutting tool.

In each of PTL 1 and PTL 2, zirconium carbide (ZrC) is used as a source material of a cemented carbide to improve plastic deformation resistance and wear resistance.

CITATION LIST

Patent Literature

PTL 1: Japanese Patent Laying-Open No. 2008-69420
PTL 2: Japanese Patent Laying-Open No. 6-93367

SUMMARY OF INVENTION

A cemented carbide according to the present disclosure includes a first phase and a second phase, wherein the first phase consists of a plurality of tungsten carbide grains, a content ratio of the first phase of the cemented carbide is 65 volume % or more and 85 volume % or less, a content ratio of the second phase of the cemented carbide is 4 volume % or more and 25 volume % or less, the second phase includes 50 mass % or more of cobalt, the second phase includes zirconium, a cobalt content ratio $M_{Co}$ of the cemented carbide is 3 mass % or more and 15 mass % or less, a and b of the cemented carbide indicate a relation of the following formula I:

$$b < 0.0485a + 0.0001 \quad \text{Formula I,}$$

where the a represents a percentage, $(M_{Zr}/M_{Co}) \times 100$, of a zirconium content ratio $M_{Zr}$ of the cemented carbide in mass % with respect to the cobalt content ratio $M_{Co}$ of the cemented carbide in mass %, the a is more than 0 and 8 or less, the b represents an area percentage of pore in a first region of a cross section of the cemented carbide, and the first region is a region located within a distance of 50 μm from a surface of the cemented carbide in the cross section.

DETAILED DESCRIPTION

Problem to be Solved by the Present Disclosure

In each of PTL 1 and PTL 2, ZrC is used to improve plastic deformation resistance and wear resistance. On the other hand, ZrC is partially oxidized before sintering, and this oxide is less likely to be reduced, remains as a gas during sintering, with the result that pores exist in the cemented carbide. Therefore, the cemented carbide using ZrC as its source material has a large number of pores, has decreased breakage resistance, and causes a decreased tool life, disadvantageously.

Therefore, an object of the present disclosure is to provide: a cemented carbide by which a cutting tool having excellent wear resistance, excellent breakage resistance, and long tool life can be provided when used as a tool material; and a cutting tool having a long tool life.

Advantageous Effect of the Present Disclosure

According to the present disclosure, it is possible to provide: a cemented carbide by which a cutting tool having excellent wear resistance, excellent breakage resistance, and long tool life can be provided when used as a tool material; and a cutting tool having a long tool life.

Description of Embodiments

First, embodiments of the present disclosure will be listed and described.

(1) A cemented carbide according to the present disclosure includes a first phase and a second phase, wherein the first phase consists of a plurality of tungsten carbide grains, a content ratio of the first phase of the cemented carbide is 65 volume % or more and 85 volume % or less, a content ratio of the second phase of the cemented carbide is 4 volume % or more and 25 volume % or less, the second phase includes 50 mass % or more of cobalt, the second phase includes zirconium, a cobalt content ratio $M_{Co}$ of the cemented carbide is 3 mass % or more and 15 mass % or less, a and b of the cemented carbide indicate a relation of the following formula I:

$$b < 0.0485a + 0.0001 \quad \text{Formula I,}$$

where the a represents a percentage, $(M_{Zr}/M_{Co}) \times 100$, of a zirconium content ratio $M_{Zr}$ of the cemented carbide in mass % with respect to the cobalt content ratio $M_{Co}$ of the cemented carbide in mass %, the a is more than 0 and 8 or less, the b represents an area percentage of pore in a first region of a cross section of the cemented carbide, and the first region is a region located within a distance of 50 μm from a surface of the cemented carbide in the cross section.

According to the present disclosure, it is possible to provide: a cemented carbide by which a cutting tool having excellent wear resistance, excellent breakage resistance, and long tool life can be provided when used as a tool material; and a cutting tool having a long tool life.

(2) In (1), the a and the b may indicate a relation of the following formula II:

$$b \leq 0.0350a + 0.0001 \qquad \text{Formula II.}$$

According to this, balance between improvement of hardness and decrease of pores in the cemented carbide is improved, thereby further improving the wear resistance and breakage resistance of the cutting tool including the cemented carbide.

(3) In (1) or (2), the b may be 0.0001 or more.

(4) In any one of (1) to (3), the a may be 0.0250 or more. According to this, plastic deformation resistance of the cemented carbide is improved.

(5) In any one of (1) to (4), an area percentage of the pore in a second region of the cross section of the cemented carbide may be 0.01% or more and 0.40% or less. Here, the second region is a region located beyond the distance of 50 μm from the surface of the cemented carbide toward an inner side of the cemented carbide in the cross section.

According to this, the breakage resistance of the cutting tool including the cemented carbide is further improved, thereby further improving the tool life.

(6) A cutting tool according to the present disclosure is a cutting tool including the cemented carbide according to any one of (1) to (5). According to the present disclosure, it is possible to provide a cutting tool having a long tool life.

Details of Embodiments of the Present Disclosure

Specific examples of the cemented carbide and the cutting tool according to the present disclosure will be described below with reference to figures. In the figures of the present disclosure, the same reference characters represent the same or corresponding portions. Further, a dimensional relation such as a length, a width, a thickness, or a depth is appropriately changed for clarity and simplification of the figures, and therefore do not necessarily represent an actual dimensional relation.

In the present disclosure, the expression "A to B" means A or more and B or less, and when no unit is indicated for A and a unit is indicated only for B, the unit of A is the same as the unit of B.

When a compound or the like is expressed by a chemical formula in the present disclosure and an atomic ratio is not particularly limited, it is assumed that all the conventionally known atomic ratios are included, and the atomic ratio should not be necessarily limited only to one in the stoichiometric range.

In the present disclosure, when one or more numerical values are described as each of lower and upper limits of a numerical range, it is assumed that a combination of any one numerical value described as the lower limit and any one numerical value described as the upper limit is also disclosed.

In the present disclosure, the terms "comprise", "include", "have", and variations thereof are open-ended terms. Each of the open-ended terms may or may not further include an additional element in addition to an essential element. The description "consist of" is a closed term. It should be noted that even a configuration expressed by such a closed term can include an impurity introduced in an ordinary case or an additional element irrelevant to the target technology.

First Embodiment: Cemented Carbide

A cemented carbide according to one embodiment (hereinafter, also referred to as "first embodiment") of the present disclosure is a cemented carbide including a first phase and a second phase, wherein the first phase consists of a plurality of tungsten carbide grains, a content ratio of the first phase of the cemented carbide is 65 volume % or more and 85 volume % or less, a content ratio of the second phase of the cemented carbide is 4 volume % or more and 25 volume % or less, the second phase includes 50 mass % or more of cobalt, the second phase includes zirconium, a cobalt content ratio $M_{Co}$ of the cemented carbide is 3 mass % or more and 15 mass % or less, a and b of the cemented carbide indicate a relation of the following formula I:

$$b < 0.0485a + 0.0001 \qquad \text{I, where}$$

the a represents a percentage, $(M_{Zr}/M_{Co}) \times 100$, of a zirconium content ratio $M_{Zr}$ of the cemented carbide in mass % with respect to the cobalt content ratio $M_{Co}$ of the cemented carbide in mass %, the a is more than 0 and 8 or less, the b represents an area percentage of pore in a first region of a cross section of the cemented carbide, and the first region is a region located within a distance of 50 μm from a surface of the cemented carbide in the cross section.

When the cemented carbide according to the present disclosure is used as a tool material, it is possible to provide a cutting tool having excellent wear resistance, excellent breakage resistance, and long tool life. A reason for this is not clear but is presumed as follows.

(i) The cemented carbide according to the present disclosure includes 65 volume % or more and 85 volume % or less of the first phase consisting of the plurality of tungsten carbide grains (hereinafter, also referred to as "WC grains"). Each of the tungsten carbide grains has high hardness and high thermal conductivity. Thus, the cemented carbide according to the present disclosure also has high hardness and high thermal conductivity, and a cutting tool including the cemented carbide can have excellent wear resistance.

(ii) The cobalt content ratio $M_{Co}$ of the cemented carbide according to the present disclosure is 3 mass % or more and 15 mass % or less. Cobalt has high toughness. Therefore, the cemented carbide according to the present disclosure also has high toughness, and a cutting tool including the cemented carbide can have excellent breakage resistance.

(iii) The second phase of the cemented carbide according to the present disclosure includes zirconium. When zirconium is dissolved in a solid state in the cobalt existing in the second phase, high-temperature hardness of the cobalt is improved. Thus, plastic deformation resistance of the cemented carbide according to the present disclosure is improved, and a cutting tool including the cemented carbide can have excellent wear resistance.

(iv) The cemented carbide according to the present disclosure satisfies the relation of formula I described above. According to this, the pores in the cemented carbide are sufficiently decreased, and a cutting tool including the cemented carbide can have excellent breakage resistance.

<Composition of Cemented Carbide>

<<Content Ratios of First Phase and Second Phase>>

The content ratio of the first phase of the cemented carbide according to the first embodiment is 65 volume % or more and 85 volume % or less. When the content ratio of the first phase of the cemented carbide is 80 volume % or more and 85 volume % or less, the hardness of the cemented carbide is further improved. When the content ratio of the first phase of the cemented carbide is 70 volume % or more and 80 volume % or less, the toughness of the cemented carbide is further improved.

The content ratio of the second phase of the cemented carbide according to the first embodiment is 4 volume % or more and 25 volume % or less. When the content ratio of the second phase of the cemented carbide is 15 volume % or more and 25 volume % or less, the toughness of the cemented carbide is further improved. When the content ratio of the second phase of the cemented carbide is 4 volume % or more and less than 15 volume %, the hardness of the cemented carbide is further improved.

The cemented carbide according to the first embodiment includes the first phase and the second phase. In the cemented carbide according to the first embodiment, the total content ratio of the first phase and the second phase of the cemented carbide according to the first embodiment may be 74 volume % or more and 100 volume % or less, may be 80 volume % or more and 98 volume % or less, may be 85 volume % or more and 95 volume % or less, or may be 88 volume % or more and 92 volume % or less.

The cemented carbide according to the first embodiment may consist of the first phase and the second phase. In this case, the cemented carbide may include an inevitable impurity as long as the effects of the present disclosure are not impaired.

As long as the effects of the present disclosure are not impaired, the cemented carbide according to the first embodiment may include another phase in addition to the first phase and the second phase. Examples of the other phase include a carbide, nitride or carbonitride including at least one element selected from a group consisting of titanium (Ti), tantalum (Ta), niobium (Nb), hafnium (Hf) and molybdenum (Mo). The other phase may be, for example, at least one selected from a group consisting of TiCN, TaC, NbC, HfC, and $Mo_2C$.

The cemented carbide according to the first embodiment may consist of the first phase, the second phase, and the other phase. The content ratio of the other phase of the cemented carbide according to the first embodiment is permitted to fall within a range that does not impair the effects of the present disclosure. For example, the content ratio of the other phase of the cemented carbide may be more than 0 volume % and 26 volume % or less. In this case, the cemented carbide may include an inevitable impurity as long as the effects of the present disclosure are not impaired.

The cemented carbide according to the first embodiment may include the inevitable impurity. Examples of the inevitable impurity include iron (Fe), calcium (Ca), silicon (Si), and sulfur(S). The content ratio of the inevitable impurity in the cemented carbide is permitted to fall within a range that does not impair the effects of the present disclosure. For example, the content ratio of the inevitable impurity in the cemented carbide may be 0 mass % or more and less than 0.1 mass %. The content ratio of the inevitable impurity in the cemented carbide is measured by ICP (Inductively Coupled Plasma) emission spectrometry.

In the present disclosure, the content ratio of the first phase and the content ratio of the second phase of the cemented carbide are measured in the following procedure.

(A1) The cemented carbide is cut at any position to expose a cross section. The cross section is mirror-finished using a cross section polisher (provided by JEOL).

(B1) An analysis is performed onto the mirror-finished surface of the cemented carbide using an energy dispersive X-ray spectrometer (SEM-EDX) accompanied with a scanning electron microscope (device: Gemini 450 (trademark) provided by Carl Zeiss) so as to specify elements included in the cemented carbide.

(C1) The mirror-finished surface of the cemented carbide is imaged using the scanning electron microscope (SEM), thereby obtaining a backscattered electron image. An imaging region is set at the central portion of the cross section of the cemented carbide. An observation magnification is 5000 times. Measurement conditions are an acceleration voltage of 10 kV, a current value of 2 nA, and a working distance (WD) of 10 mm.

(D1) An analysis is performed onto the imaging region described above in (C1) using the SEM-EDX so as to specify distributions of the elements specified as described above in (B1) in the imaging region, thereby obtaining an element mapping image.

(E1) The backscattered electron image obtained as described above in (C1) is loaded into a computer, and is subjected to binarization processing using image analysis software (ImageJ, version 1.51j8: https://imagej.nih.gov/ij/). Since a threshold value for the binarization is changed depending on a contrast, the threshold value is set for each image. In the image having been through the binarization processing, the first phase (tungsten carbide grains) is shown in white, and the second phase is shown in black.

(F1) The element mapping image obtained as described above in (D1) and the image having been through the binarization processing and obtained as described above in (E1) are superimposed on each other so as to specify respective existence regions of the first phase and the second phase on the image having been through the binarization processing. A region, which shown in white in the image having been through the binarization processing and in which tungsten (W) and carbon (C) exist in the element mapping image, corresponds to the existence region of the first phase. A region, which is shown in black in the image having been through the binarization processing and in which cobalt (Co) exists in the element mapping image, corresponds to the existence region of the second phase.

(G1) A measurement visual field having a rectangular shape of 24.9 μm×18.8 μm is set in the image having been through the binarization processing. The above-described image analysis software is used to measure an area percentage of each of the first phase and the second phase with the area of the entire measurement visual field as the denominator.

(H1) The measurement described above in (G1) is performed in each of six different measurement visual fields that do not overlap with one another. In the present disclosure, the average of the area percentages of the first phase in the six measurement visual fields corresponds to the content ratio (volume %) of the first phase of the cemented carbide, and the average of the area percentages of the second phase in the six measurement visual fields corresponds to the content ratio (volume %) of the second phase of the cemented carbide.

When the cemented carbide includes the other phase in addition to the first phase and the second phase, the content ratio of the other phase of the cemented carbide can be obtained by subtracting, from the total content ratio (100 volume %) of the cemented carbide, the content ratio (volume %) of the first phase and the content ratio (volume %) of the second phase each measured in the above-described procedure.

As long as the measurement is performed for the same sample, it was confirmed that there are substantially no variations in measurement results even when the position of cut of the cemented carbide for the cross section, the imaging region described above in (C1), and the measurement visual fields described above in (G1) are freely set and the measurement of each of the content ratio of the first phase and the content ratio of the second phase of the cemented carbide is performed a plurality of times in accordance with the above-described procedure.

<<Cobalt Content Ratio $M_{Co}$ of Cemented Carbide>>

The cobalt content ratio $M_{Co}$ of the cemented carbide according to the first embodiment is 3 mass % or more and 15 mass % or less. When the cobalt content ratio $M_{Co}$ of the cemented carbide is 10 mass % or more and 15 mass % or less, the toughness of the cemented carbide is further improved. When the cobalt content ratio $M_{Co}$ of the cemented carbide is 3 mass % or more and less than 10 mass %, the hardness of the cemented carbide is further improved.

A method of measuring the cobalt content ratio $M_{Co}$ of the cemented carbide is as follows. An element mapping image is obtained by performing an analysis using the SEM-EDX in the same manner as in the method of measuring the content ratio of the first phase and the content ratio of the second phase of the cemented carbide. A region of cobalt in the cemented carbide is specified based on the element mapping image, and the cobalt content ratio is measured. The measurement is performed in each of six different imaging regions that do not overlap with one another. In the present disclosure, the average of the cobalt content ratios in the six imaging regions corresponds to the cobalt content ratio $M_{Co}$ of the cemented carbide. The zirconium content ratio $M_{Zr}$ of the cemented carbide described later is also measured in the same manner except that a region of zirconium is specified instead of cobalt.

As long as the measurement is performed for the same sample, it was confirmed that there are substantially no variations in measurement results even when the position of cut of the cemented carbide for the cross section and the imaging region are freely set and the cobalt content ratio or the zirconium content ratio of the cemented carbide is measured a plurality of times in accordance with the above-described procedure.

<First Phase>

In the cemented carbide according to the first embodiment, the first phase consists of the plurality of tungsten carbide grains. Here, the tungsten carbide grains include not only "pure WC grains (including WC containing no inevitable impurity element at all and WC containing an inevitable impurity element at an amount less than the detection limit)" but also "WC grains each including an inevitable impurity therein as long as the effects of the present disclosure are not impaired". Examples of the inevitable impurity include iron (Fe), molybdenum (Mo), and sulfur(S).

<<Average Grain Size of Tungsten Carbide Grains>>

In the cemented carbide according to the first embodiment, the average grain size of the tungsten carbide grains may be 1 μm or more and 6 μm or less. When the average grain size of the tungsten carbide grains is 3 μm or more, falling-off and wear due to the use are less likely to occur in the cutting tool using the cemented carbide. When the average grain size of the tungsten carbide grains is less than 3 μm, the cemented carbide has excellent deflective strength, thereby further improving the breakage resistance of the cutting tool using the cemented carbide.

In the cemented carbide according to the first embodiment, a ratio d10/d90 of a grain size d10 at a cumulation of 10% from the small-size side to a grain size d90 at a cumulation of 90% from the small-size side in a number-based cumulative grain size distribution of the tungsten carbide grains may be 0.2 or more and 0.3 or less. When d10/d90 is 0.2 or more, the deflective strength of the cemented carbide is likely to be improved.

In the present disclosure, the average grain size and d90/d10 of the tungsten carbide grains are measured in the following procedure.

(A2) Six images each having been through binarization processing are obtained in the same manner as in the above-described method of measuring the content ratio of the first phase and the content ratio of the second phase of the cemented carbide.

(B2) A measurement visual field having a rectangular shape with a length of 25.3 μm×a width of 17.6 μm is set in each of the obtained six images each having been through the binarization processing. An equivalent circle diameter (Heywood diameter: equivalent-area equivalent circle diameter) is measured for each of all the tungsten carbide grains (first phase) in the six measurement visual fields using image analysis software (ImageJ, version 1.51j8).

(C2) The number-based arithmetic average value and d90/d10 of the equivalent circle diameters are calculated based on all the tungsten carbide grains except for tungsten carbide grains each having an equivalent circle diameter of 0.22 μm or less among the tungsten carbide grains in the six measurement visual fields. In the present disclosure, the arithmetic average value and d90/d10 correspond to the average grain size and d90/d10 of the tungsten carbide grains, respectively.

In calculating the average grain size, the tungsten carbide grains each having an equivalent circle diameter of 0.22 μm or less are excluded due to the following reason: in the measurement by the present inventors, it was confirmed that grains each having an equivalent circle diameter of 0.22 μm or less often correspond to noise incorrectly detected as tungsten carbide grains in the image analysis.

As long as the measurement by the applicant is performed for the same sample, it has been confirmed that even when the measurement is performed a plurality of times while changing a selected position of each measurement visual field, variations in measurement results are small and the measurement results are not intentional even though the measurement visual field is freely set.

<Second Phase>

In the cemented carbide according to the first embodiment, the second phase includes 50 mass % or more of cobalt. Thus, the cemented carbide can have excellent toughness. The cobalt content ratio of the second phase may be 50 mass % or more and less than 100 mass %, may be 60 mass % or more and 90 mass % or less, or may be 70 mass % or more and 80 mass % or less.

A method of measuring the cobalt content ratio of the second phase is as follows. An element mapping image and an image having been through binarization processing are obtained in the same manner as in the method of measuring the content ratio of the first phase and the content ratio of the second phase of the cemented carbide. The element mapping image and the image having been through the binarization processing are superimposed on each other so as to specify the existence region of the second phase in the element mapping image. One measurement visual field having a rectangular shape of 24.9 μm×18.8 μm is set in the element mapping image. The cobalt content ratio is measured in the existence region of the second phase within the measurement visual field. The above-described measurement is performed in each of six different measurement visual fields that do not overlap with one another. In the present disclosure, the average of the cobalt content ratios in the existence regions of the second phase within the six measurement visual fields corresponds to the cobalt content ratio of the second phase.

As long as the measurement is performed for the same sample, it was confirmed that there are substantially no variations in measurement results even when the position of cut of the cemented carbide for the cross section, the imaging region, and the above-described measurement visual fields are set freely and the measurement of the cobalt content ratio of the second phase is performed a plurality of times in accordance with the above-described procedure.

In the cemented carbide according to the first embodiment, the second phase includes zirconium.

The second phase is confirmed to include zirconium in the following procedure. An element mapping image and an image having been through binarization processing are obtained in the same manner as in the method of measuring the content ratio of the first phase and the content ratio of the second phase of the cemented carbide. The element mapping image and the image having been through the binarization processing are superimposed on each other so as to specify the existence region of the second phase in the element mapping image. When zirconium exists in the existence region of the second phase in the element mapping, it is confirmed that the second phase includes zirconium.

The second phase of the cemented carbide according to the first embodiment includes cobalt and zirconium. The second phase of the cemented carbide according to the first embodiment may consist of cobalt and zirconium. In this case, the cemented carbide may include an inevitable impurity as long as the effects of the present disclosure are not impaired.

As long as the effects of the present disclosure are not impaired, the second phase of the cemented carbide according to the first embodiment may include at least one first element selected from a group consisting of iron (Fe), nickel (Ni), and chromium (Cr), in addition to cobalt and zirconium. The second phase of the cemented carbide according to the first embodiment may consist of cobalt, zirconium, and the first element. In this case, the second phase may include an inevitable impurity as long as the effects of the present disclosure are not impaired. Examples of the inevitable impurity include manganese (Mn), magnesium (Mg), calcium (Ca), molybdenum (Mo), sulfur(S), and aluminum (Al).

<Relation Among Cobalt Content Ratio $M_{Co}$ in Cemented Carbide, Zirconium Cobalt Content Ratio $M_{Zr}$ in Cemented Carbide, and Area Percentage of Pore in First Region>

The a and the b of the cemented carbide according to the first embodiment satisfy the relation of the following formula I:

$$b < 0.0485a + 0.0001 \quad \text{Formula I}$$

In formula I, the a represents a percentage, $(M_{Zr}/M_{Co}) \times 100$, of the zirconium content ratio $M_{Zr}$ of the cemented carbide in mass % with respect to the cobalt content ratio $M_{Co}$ of the cemented carbide in mass %.

The a is more than 0 and 8 or less. When the a is more than 0, the high-temperature hardness of cobalt is improved. When the a is more than 8, zirconium that cannot be dissolved in cobalt in a solid state is precipitated, thus resulting in decreased breakage resistance of the cutting tool including the cemented carbide. From the viewpoint of improving the breakage resistance, the a is 8 or less. The a may be 0.0250 or more, may be 0.0250 or more and 8 or less, may be 1.5 or more and 7.1 or less, or may be 2.0 or more and 7.1 or less.

The b represents the area percentage of pore in the first region of the cross section of the cemented carbide, and the first region is a region located within a distance of 50 μm from the surface of the cemented carbide in the cross section. The b may be 0.0001 or more and 0.40 or less, may be 0.05 or more and 0.30 or less, may be 0.06 or more and 0.20 or less, or may be 0.08 or more and 0.18 or less.

The a and the b of the cemented carbide according to the first embodiment may satisfy a relation of the following formula II:

$$b \leq 0.0350a + 0.0001 \quad \text{Formula II}$$

In the present disclosure, the area percentage of pore in the first region of the cross section of the cemented carbide is measured in the following procedure.

(A2) The cemented carbide is cut in a direction along the normal line of the surface thereof so as to expose the cross section. The cross section is mirror-finished using a cross section polisher (provided by JEOL).

Figure 1:
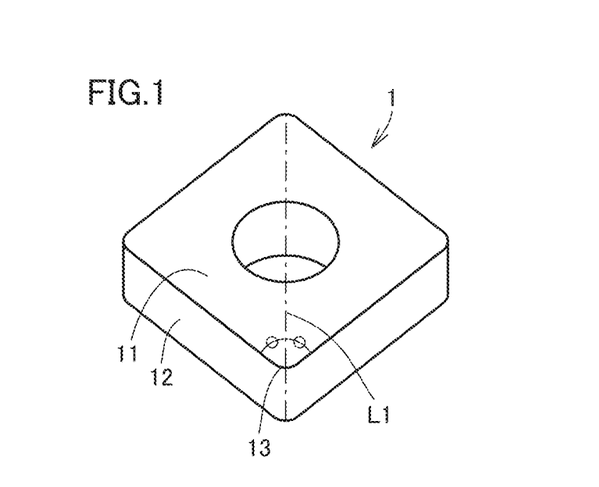
FIG. 1 is a diagram for illustrating a position of cut of a cutting tool composed of a cemented carbide according to a first embodiment.
Figure 2:
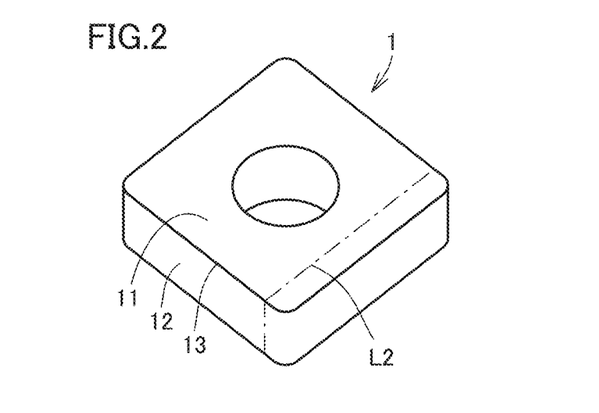
FIG. 2 is a diagram for illustrating another exemplary position of cut of the cutting tool composed of the cemented carbide according to the first embodiment.

When the cemented carbide is shaped into a cutting tool shape, the position of cut is determined in view of an actual situation of use of the cutting tool. Each of FIGS. 1 and 2 is a diagram for illustrating a position of cut of a cutting tool 1 composed of the cemented carbide according to the first embodiment. In cutting tool 1, an upper surface and a lower surface form a rake face 11, and four side surfaces (and arc surfaces connecting them) form a flank face 12. Further, a boundary portion between rake face 11 and flank face 12 functions as a region of a cutting edge 13.

When cutting tool 1 is used to cut a workpiece using cutting edge 13 at its corner portion (corner portion at a vertex to form an arc), cutting tool 1 is cut to expose a cross section that includes a line L1 bisecting the corner portion and that extends in the direction along the normal line of the surface of the cutting tool as shown in FIG. 1. On the other hand, when cutting tool 1 is used to cut a workpiece using cutting edge 13 at a straight portion (portion to form a straight line), cutting tool 1 is cut to expose a cross section that includes a line L2 perpendicular to cutting edge 13 at the straight portion and that extends in the direction along the normal line of the surface of the cutting tool as shown in FIG. 2.

(B2) An analysis is performed onto the mirror-finished surface of the cemented carbide using an energy dispersive X-ray spectrometer (SEM-EDX) accompanied with a scanning electron microscope (device: Gemini 450 (trademark) provided by Carl Zeiss) so as to specify elements included in the cemented carbide.

(C2) The mirror-finished surface of the cemented carbide is imaged using the scanning electron microscope (SEM), thereby obtaining a backscattered electron image. An imaging region is set to include the surface of the cemented carbide. An observation magnification is 5000 times. Measurement conditions are an acceleration voltage of 10 kV, a current value of 2 nA, and a working distance (WD) of 10 mm.

(D2) An analysis is performed onto the imaging region described above in (C2) using the SEM-EDX so as to specify distributions of the elements specified as described above in (B2) in the imaging region, thereby obtaining an element mapping image.

(E2) The backscattered electron image obtained as described above in (C2) is loaded into a computer, and is subjected to binarization processing using image analysis software (ImageJ, version 1.51j8: https://imagej.nih.gov/ij/). Since a threshold value for the binarization is changed depending on a contrast, the threshold value is set for each image. In the image having been through the binarization processing, the first phase (tungsten carbide grains) is shown in white, and the pores and the second phase are shown in black.

(F2) The element mapping image obtained as described above in (D2) and the image having been through the binarization processing and obtained as described above in (E2) are superimposed on each other so as to specify a pore region on the image having been through the binarization processing. A region, which is shown in black in the image having been through the binarization processing and in which no element exists in the element mapping image, correspond to the pore region.

(G2) The first region interposed between the surface of the cemented carbide and an imaginary line L located at a distance of 50 μm from the surface toward an inner side of the cemented carbide is specified in the image having been through the binarization processing. A measurement visual field having a rectangular shape of 24.9 μm×18.8 μm is set in the first region. The above-described image analysis software is used to measure the area percentage of pore with the area of the entire measurement visual field as the denominator.

(H2) The measurement described above in (G2) is performed in each of six different measurement visual fields that do not overlap with one another and that are set in the first region. In the present disclosure, the average of the area percentages of pore in the six measurement visual fields corresponds to the area percentage of pore in the first region of the cross section of the cemented carbide.

As long as the measurement is performed for the same sample, it was confirmed that there are substantially no variations in measurement results even when the position of cut of the cemented carbide for the cross section, the imaging region described above in (C2), and the measurement visual fields described above in (G2) are freely set within the above-described ranges and the measurement of the area percentage of pore in the first region of the cross section of the cemented carbide is performed a plurality of times in accordance with the above-described procedure.

<Area Percentage of Pore in Second Region of Cemented Carbide>

An area percentage of pore in a second region of the cross section of the cemented carbide according to the first embodiment may be 0.01% or more and 0.40% or less. The second region is a region located beyond the distance of 50 μm from the surface of the cemented carbide toward the inner side of the cemented carbide in the cross section. When the area percentage of pore in the second region is 0.40% or less, the breakage resistance of the cutting tool including the cemented carbide is further improved. The area percentage of pore in the second region may be 0.01% or more and 0.20% or less.

In the present disclosure, the area percentage of pore in the second region of the cross section of the cemented carbide is measured in the same manner as in the above-described method of measuring the area percentage of pore in the first region of the cross section of the cemented carbide, except that the measurement visual field is set in the second region located beyond the distance of 50 μm from the surface of the cemented carbide toward the inner side of the cemented carbide.

As long as the measurement is performed for the same sample, it was confirmed that there are substantially no variations in measurement results even when the position of cut of the cemented carbide for the cross section, the imaging region described above in (C2), and the measurement visual fields described above in (G2) are freely set within the above-described ranges and the measurement of the area percentage of pore in the second region of the cross section of the cemented carbide of the cemented carbide is performed a plurality of times in accordance with the above-described procedure.

<Method of Producing Cemented Carbide>

The cemented carbide according to the first embodiment can be produced by, for example, performing a source material powder preparation step, a mixing step, a pressing step, a sintering step, and a cooling step in this order. Hereinafter, each step will be described.

<<Source Material Powder Preparation Step>>

In the source material powder preparation step, source material powders for the cemented carbide are prepared. As the source material powders, a tungsten carbide powder (hereinafter, also referred to as "WC powder") as a source material for the first phase, a cobalt powder (hereinafter, also referred to as "Co powder") as a source material for the second phase, and a zirconium carbide powder (hereinafter, also referred to as "ZrC powder") are prepared.

As the tungsten carbide powder, a WC powder having fine and uniform particle sizes is prepared. Specifically, a WC powder having an average particle size of 1.5 μm or more and 6.0 μm or less and having a d10/d90 of 0.2 or more is prepared.

As the cobalt powder, a Co powder having fine and uniform particle sizes is prepared. Specifically, a Co powder having an average particle size of 0.5 μm or more and 3.0 μm or less and having a d10/d90 of 0.2 or more is prepared.

The average particle size of the zirconium carbide powder is 1.8 μm or more and 2.5 μm or less.

In the present disclosure, the average particle size of each source material powder is measured by an FSSS (Fisher Sub-Sieve Sizer) method. A measurement instrument used for the FSSS method is "Sub-Sieve Sizer Model 95" (trademark) provided by Fisher Scientific.

In the present disclosure, d10/d90 of the source material powder means a ratio of a particle size d10 at a cumulation of 10% from the small-size side to a particle size d90 at a cumulation of 90% from the small-size side in a volume-based cumulative particle size distribution of the source material powder. The particle size distribution of the WC powder is measured using a particle size distribution measurement device (trade name: MT3300EX) provided by Microtrac.

A titanium carbide (TiC) powder, a titanium nitride (TiN) powder, a tantalum carbide (TaC) powder, or a niobium carbide (NbN) powder, each of which is a source material powder for the other phase, may be further prepared as the source material powder, and a chromium carbide ($Cr_3C_2$) powder may be prepared as a grain growth inhibitor. The average particle size of the source material powder for the other phase may be 0.5 μm or more and 2.0 μm or less. As the source material powder for the other phase, a commercially available powder can be used.

<<Mixing Step>>

In the mixing step, the source material powders prepared in the preparation step are mixed to obtain a powder mixture. The content ratios of the source material powders in the powder mixture is appropriately adjusted in consideration of the content ratios of the components such as the first phase and the second phase of the cemented carbide.

An attritor is used for the mixing. First, the source material powders other than the Co powder are introduced into the attritor and are mixed for 3 to 6 hours (hereinafter, also referred to as "first mixing"). Then, the Co powder is further introduced into the attritor and they are mixed for 3 to 6 hours (hereinafter, also referred to as "second mixing"), thereby obtaining the powder mixture.

<<Pressing Step>>

The pressing step is a step of obtaining a molded material by press-molding the powder mixture obtained in the mixing step into a predetermined shape. A pressing pressure is 1.0 to 2.0 t/cm$^2$. As a pressing method, a general method can be used. Examples of the shape of the molded material include a cutting tool shape.

<<Sintering Step>>

In the sintering step, the molded material obtained in the molding step is sintered to obtain the cemented carbide. First, the molded material is placed in a sintering furnace, is heated to a sintering temperature of 1410 to 1460° C., and is held at a sintering temperature for 30 to 60 minutes. When holding at the sintering temperature, argon (Ar) is introduced into the sintering furnace to attain a pressure of 140 to 500 kPa in the sintering furnace. Thus, the molded material is sintered, thereby obtaining the cemented carbide.

<<Cooling Step>>

The cooling step is a step of cooling the cemented carbide after the sintering is completed. For a cooling condition, a general condition may be employed, and the cooling condition is not particularly limited.

<<Feature of Method of Producing Cemented Carbide According to First Embodiment>

In the source material powder preparation step, the WC powder and the Co powder each having fine and uniform particle sizes are prepared. Therefore, in the powder mixture of the WC powder and the Co powder, the Co powder is finely and uniformly distributed. Even if pores are formed during the sintering of the molded material of the powder mixture, Co is likely to flow into the pore portion because Co exists in the vicinity of the pores, thereby decreasing the pores. In order to distribute the Co powder finely and uniformly in the powder mixture, the particle sizes of the WC powder also need to be fine and uniform. The present inventors have newly found the step of preparing the WC powder and the Co powder each having fine and uniform particle sizes in order to facilitate the flow of Co into the pore portion, and the step has not been conventionally performed.

In the mixing step, an attritor having strong pulverizing force is used. Thus, the Co powder can be uniformly and finely distributed in the powder mixture. However, Co, which is a source material having ductility and malleability, is reaggregated when a mixing time is long. In order to suppress the re-aggregation of Co, it is necessary to set the mixing time to a length by which Co is not re-aggregated.

On the other hand, WC is aggregated in the source material powders, and needs to be mixed for a longer time than Co in order to pulverize the aggregated WC. In the mixing step, the source material powders including the WC powder and other than the Co powder are mixed for 3 to 6 hours (first mixing), and then the Co powder is mixed therein and they are mixed for 3 to 6 hours (two-stage mixing). Thus, the aggregated WC is sufficiently pulverized, and the Co is uniformly and finely distributed in the powder mixture without being reaggregated. In the conventional method of producing a cemented carbide, the two-stage mixing is not performed because the mixing time is long and production cost is increased.

In the pressing step, the powder mixture is press-molded into a predetermined shape to obtain a molded material. Thus, the molded material becomes dense, Co is disposed in the vicinity of pores in the molded material, and Co is facilitated to flow into the pore portion during sintering of the molded material, thereby decreasing the pores. A pressing pressure on the molded material is 1.0 to 2.0 t/cm$^2$. Since the pressing pressure is 1.0 t/cm$^2$ or more, the molded material is promoted to become dense. Since the pressing pressure is 2.0 t/cm$^2$ or less, a crack is suppressed from being generated in the molded material. In the conventional method of producing a cemented carbide, the pressing step using the pressing pressure in the above range is not performed.

In the sintering step, the sintering temperature is 1410 to 1460° C. Since the sintering temperature is 1410° C. or more, movement of Co during the sintering is promoted, with the result that Co is facilitated to flow into the pore portion. Since the sintering temperature is 1460° C. or less, abnormal grain growth of WC is suppressed, thereby suppressing decreased chipping resistance of the cemented carbide. Further, when holding at the sintering temperature, Ar is introduced into the sintering furnace so as to perform the sintering under application of pressure. Thus, the pores in the sintered material can be pushed out of the sintered material, thereby decreasing the pores. In the conventional method of producing a cemented carbide, the above-described sintering conditions are not employed.

The present inventors have found that the cemented carbide according to the first embodiment can be obtained by the production method including all of the source material powder preparation step, the mixing step, the pressing step, and the sintering step. In the conventional method of producing a cemented carbide, not all of the source material powder preparation step, the mixing step, the pressing step, and the sintering step are performed.

Second Embodiment: Cutting Tool

A cutting tool according to a second embodiment includes the cemented carbide according to the first embodiment. The cutting tool according to the second embodiment can at least include a cutting edge composed of the cemented carbide according to the first embodiment. In the present disclosure, the cutting edge means a portion involved in cutting, and means a cutting edge ridgeline in the cemented carbide and a region located within a distance of 0.5 mm from the cutting edge ridgeline toward the cemented carbide side.

Examples of the cutting tool include a cutting bite, a drill, an end mill, an indexable cutting insert for milling, an indexable cutting insert for turning, a metal saw, a gear cutting tool, a reamer, a tap, and the like.

The cemented carbide according to the first embodiment may constitute a whole of each of the tools or may constitute a part of the tool. Here, the expression "constituting a part" indicates, for example, an implementation in which the cemented carbide according to the first embodiment is brazed to a predetermined position of any substrate to form the cutting edge portion.

The cutting tool according to the second embodiment may further include a hard film that covers at least a portion of a surface of a substrate composed of the cemented carbide. As the hard film, for example, a film composed of diamond-like carbon, diamond, $Al_2O_3$, or TiCN can be used. The hard film may be a CVD film formed by a chemical vapor deposition method (CVD method).

Examples

The present embodiment will be described more specifically with reference to examples. It should be noted that the present embodiment is not limited by these examples.

<<Preparation Step>>

As source material powders, powders having compositions shown in the column "Source Material Powders" in Table 1 were prepared. A plurality of WC powders and a plurality of Co powders having different average particle sizes and different particle size distributions were prepared.

The average particle size and d10/d90 of each of the WC powders and the average particle size and d10/d90 of each of the Co powders are as shown in Table 1.

The average particle size of the titanium carbide (TiC) powder is 1.5 μm, the average particle size of the titanium nitride (TiN) powder is 2.0 μm, the average particle size of the tantalum carbide (TaC) powder is 1.0 μm, the average particle size of the niobium carbide (NbC) powder is 1.1 μm, and the average particle size of the zirconium carbide (ZrC) powder is 2.2 μm.

<<Mixing Step>>

Each of the source material powders was mixed in accordance with a formulation shown in the column "Mass %" of the "Source Material Powders" in Table 1, thereby obtaining a powder mixture. In Table 1, "Mass %" indicates a percentage of the mass of each source material powder with respect to the total mass of the source material powders.

The mixing was performed using an attritor. First, the source material powders other than the Co powder were introduced into the attritor and were mixed for a time described in the column "First Mixing" in Table 2. Then, the Co powder was further introduced into the attritor and they were mixed for a time described in the column "Second Mixing" in Table 2, thereby obtaining a powder mixture. In a sample for which "-" is described in the column "First Mixing", all the source material powders were simultaneously introduced into the attritor and were mixed for the time described in the column "Second Mixing", thereby obtaining a powder mixture.

<<Pressing Step>>

The powder mixture obtained in the mixing step is press-molded into an insert shape (CNMG120408N-GU), thereby obtaining a molded material. A pressing pressure is as shown in Table 2.

<<Sintering Step>>

The molded material was placed in a sintering furnace, was heated to a sintering temperature described in the column "Temperature" of "Sintering" in Table 2, and was held at the sintering temperature for a time described in the column "Holding Time". When holding at the sintering temperature, argon (Ar) was introduced into the sintering furnace so as to adjust the pressure in the sintering furnace to a pressure described in the column "Ar Pressure".

<<Cooling Step>>

After the sintering was completed, cooling was gradually performed in the argon (Ar) gas atmosphere, thereby obtaining a cemented carbide.

TABLE 1

| | Source Material Powders | | | | | | | | | | | |
|---|---|---|---|---|---|---|---|---|---|---|---|---|
| | WC | | | Co | | | | | | | | |
| Sample No. | Average Particle Size μm | d10/90 | Mass % | Average Particle Size μm | d10/90 | Mass % | TiC | TiN | TaC Mass % | NbC | ZrC | Zr/Co |
| 1 | 3.2 | 0.23 | 86.6 | 1.0 | 0.26 | 5.0 | 2.2 | 2.0 | 1.0 | 2.8 | 0.4 | 7.1 |
| 2 | 1.8 | 0.25 | 89.9 | 0.8 | 0.29 | 6.0 | 1.6 | 0.8 | 0.8 | 0.8 | 0.1 | 1.5 |
| 3 | 5.1 | 0.22 | 86.5 | 1.1 | 0.22 | 9.0 | 0.9 | 1.5 | 1.0 | 0.9 | 0.2 | 2.0 |
| 4 | 1.8 | 0.25 | 91.5 | 0.8 | 0.29 | 4.5 | 0.4 | 1.3 | 1.0 | 1.1 | 0.2 | 3.9 |
| 5 | 3.2 | 0.23 | 78.0 | 1.1 | 0.22 | 15.0 | 1.1 | 2.1 | 1.6 | 1.6 | 0.6 | 3.5 |
| 6 | 1.8 | 0.25 | 89.5 | 0.8 | 0.29 | 3.0 | 0.6 | 2.5 | 1.9 | 2.4 | 0.1 | 3.5 |
| 1-1 | 2.5 | 0.13 | 86.5 | 3.5 | 0.10 | 5.0 | 2.0 | 1.8 | 1.4 | 2.9 | 0.4 | 7.1 |

TABLE 2

| | Mixing | | Pressing | Sintering | | |
|---|---|---|---|---|---|---|
| Sample No. | First Mixing Time | Second Mixing Time | Pressure t/cm² | Temperature °C. | Holding Time Minute | Ar Pressure kPa |
| 1 | 3 | 5 | 1.2 | 1420 | 45 | 200 |
| 2 | 4 | 4 | 1.2 | 1450 | 45 | 400 |
| 3 | 6 | 5 | 1.5 | 1430 | 60 | 500 |
| 4 | 6 | 6 | 1.2 | 1460 | 60 | 500 |
| 5 | 4 | 4 | 1.0 | 1430 | 45 | 400 |
| 6 | 6 | 6 | 1.2 | 1460 | 60 | 500 |
| 1-1 | — | 10 | 0.9 | 1380 | 45 | 1 |

<Evaluation on Cemented Carbide>
<<Composition of Cemented Carbide>>

For each of the cemented carbides of the samples, a first phase content ratio, a second phase content ratio, a cobalt content ratio $M_{Co}$, and a zirconium content ratio $M_{Zr}$ of the cemented carbide were measured. A specific measurement method is as described in the first embodiment. Results are shown in Table 3.

For each of the cemented carbides of the samples, a cobalt content ratio of the second phase was measured. Further, it was checked whether or not the second phase includes Zr. A specific measurement method is as described in the first embodiment. Results are shown in Table 3.

<<Area Percentage of Pore in Each of First and Second Regions of Cemented Carbide>>

For each of the cemented carbides of the samples, an area percentage (described as "Porosity" in the table) of pore in each of the first region and the second region in the cross section of the cemented carbide was measured. A specific measurement method is as described in the first embodiment. Results are shown in Table 4.

<<Formulas I and II>>

Based on the cobalt content ratio $M_{Co}$, the zirconium content ratio $M_{Zr}$, and the area percentage b of pore in the first region of each of the cemented carbides of the samples, it was checked whether or not the relations of the following formulas I and II were satisfied in each sample.

$$b < 0.0485a + 0.0001 \qquad \text{Formula I}$$

$$b \leq 0.0350a + 0.0001 \qquad \text{Formula II}$$

Results are shown in Table 4. In the column "Formula I", "Yes" indicates that the relation of formula I is satisfied, whereas "No" indicates that the relation of formula I is not satisfied. In the column "Formula II", "Yes" indicates that the relation of formula II is satisfied, whereas "No" indicates that the relation of formula II is not satisfied.

Figure 3:
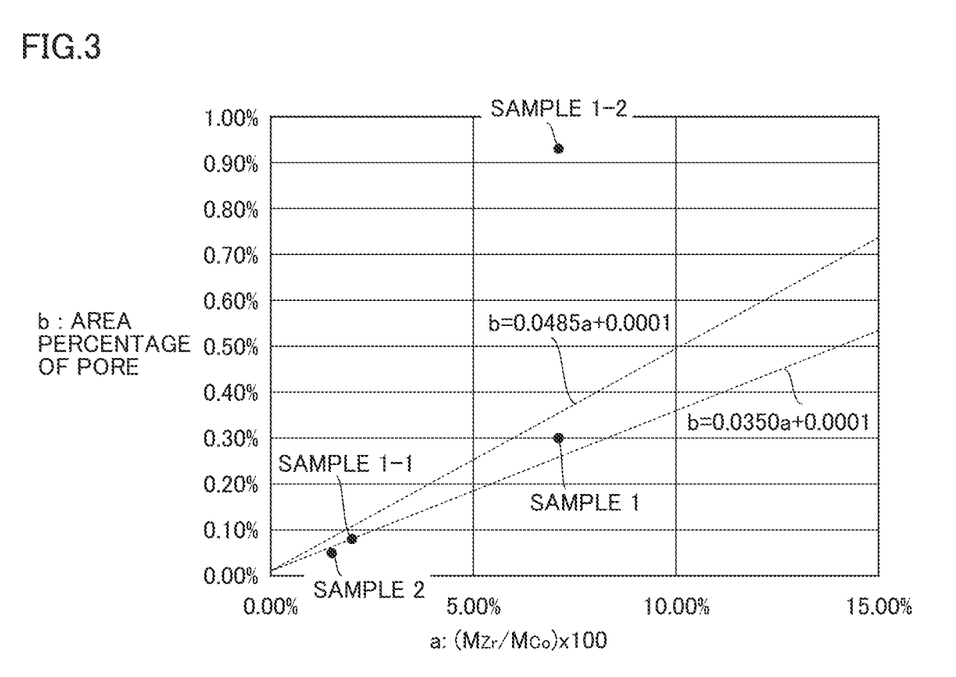
FIG. 3 is a graph showing a relation between a percentage, $(M_{Zr}/M_{Co}) \times 100$, of a zirconium content ratio $M_{Zr}$ of a cemented carbide of each sample, which is produced in Examples, in mass % with respect to a cobalt content ratio $M_{Co}$ of the cemented carbide in mass % and an area percentage of pore in a first region.

FIG. 3 shows a graph showing a relation between a percentage, $(M_{Zr}/M_{Co}) \times 100$, of the zirconium content ratio $M_{Zr}$ of the cemented carbide of each of samples 1, 2, 1-1, and 1-2 in mass % with respect to the cobalt content ratio $M_{Co}$ of the cemented carbide in mass % and the area percentage of pore in the first region. In FIG. 3, a horizontal axis a represents the percentage $(M_{Zr}/M_{Co}) \times 100$, and a vertical axis b represents the area percentage of pore in the first region.

<<Average Grain Size and d90/d10 of Tungsten Carbide Grains>

In each of the cemented carbides of the samples, the average grain size and d90/d10 of the tungsten carbide grains were measured by the method described in the first embodiment. In each of samples 1 to 6, the average grain size of the tungsten carbide grains was 1 µm or more and 6 µm or less, and d10/d90 was 0.2 or more and 0.3 or less.

TABLE 3

| | Cemented Carbide | | | | | |
|---|---|---|---|---|---|---|
| | First Phase | Second Phase | | | Co | Zr |
| Sample No. | Content Ratio Volume % | Content Ratio Volume % | Co Content Ratio Mass % | Presence/ Absence of Zr | Content Ratio $M_{Co}$ Mass % | Content Ratio $M_{Zr}$ Mass % |
| 1 | 75 | 8 | 93 | Present | 5 | 0.4 |
| 2 | 81 | 10 | 98 | Present | 6 | 0.1 |
| 3 | 77 | 14 | 98 | Present | 9 | 0.2 |
| 4 | 85 | 8 | 96 | Present | 4.5 | 0.2 |
| 5 | 65 | 23 | 96 | Present | 15 | 0.6 |
| 6 | 81 | 5 | 97 | Present | 3 | 0.1 |
| 1-1 | 75 | 8 | 37 | Present | 5 | 0.4 |

<Cutting Test 1>

Each of the cutting tools (tool model number: CNMG120408N-GU (provided by Sumitomo Electric Hardmetal)) of the samples was used to perform turning under below-described conditions, and an average wear amount Vb (mm) of the flank face side of the cutting tool after the cutting for 15 minutes was measured. It is indicated that as average wear amount Vb (mm) is smaller, the wear resistance is more excellent and the tool life is longer. In cutting test 1, when average wear amount Vb (mm) is 0.25 mm or less, it is determined that the wear resistance is excellent and the tool life is long. Results are shown in the column "Cutting Test 1" in Table 4.

<<Cutting Conditions>>
  Workpiece: S45C
  Processing: turning for the outer diameter of a round bar
  Cutting speed: 280 m/min
  Feed amount: 0.25 mm/rev
  Cut-in amount: 1.5 mm
  Cutting liquid: water-soluble cutting oil <Cutting Test 2>

The cutting tools (tool model number: CNMG120408N-GU (provided by Sumitomo Electric Hardmetal)) of the samples were prepared. Turning was performed using 20 corners of the cutting tools under below-described conditions so as to measure a ratio (hereinafter also referred to as "breakage ratio (%)") of the number of corners broken within 20 seconds. It is indicated that as the breakage ratio is smaller, the breakage resistance is more excellent and the tool life is longer. In cutting test 2, when the breakage ratio is 5% or less, it is determined that the tool life is long. Results are shown in the column "Cutting Test 2" in Table 4.

<<Cutting Conditions>>
  Workpiece: SCM435 (round bar with a groove)
  Processing: intermittent processing for the outer diameter of the round bar with the groove
  Cutting speed: 150 m/min
  Feed amount: 0.20 mm/rev
  Cut-in amount: 2.0 mm
  Cutting liquid: None In the present example, when average wear amount Vb is 0.25 mm or less in cutting test 1 and the breakage ratio is 5% or less in cutting test 2, it is determined that the cutting tool has excellent wear resistance, excellent breakage resistance, and long tool life.

<Review>

Each of the cemented carbides and cutting tools of samples 1 to 6 corresponds to an example of the present

TABLE 4

| | Cemented Carbide | | | | | Cutting Test 1 Average Wear Amount Vb mm | Cutting Test 2 Breakage Ratio % |
|---|---|---|---|---|---|---|---|
| Sample No. | a $(M_{Zr}/M_{Co}) \times 100$ % | First Region Porosity b Area % | Formula I Yes/No | Formula II Yes/No | Second Region Porosity Area % | | |
| 1 | 7.1 | 0.30 | Yes | No | 0.37 | 0.12 | 5 |
| 2 | 1.5 | 0.05 | Yes | Yes | 0.10 | 0.20 | 0 |
| 3 | 2.0 | 0.08 | Yes | No | 0.13 | 0.25 | 0 |
| 4 | 3.9 | 0.18 | Yes | No | 0.39 | 0.08 | 5 |
| 5 | 3.5 | 0.06 | Yes | Yes | 0.10 | 0.25 | 0 |
| 6 | 3.5 | 0.16 | Yes | No | 0.37 | 0.10 | 5 |
| 1-1 | 7.1 | 0.93 | No | No | 1.20 | 0.12 | 80 | disclosure. It was confirmed that each of these cutting tools has excellent wear resistance, excellent breakage resistance, and long tool life.

Each of the cemented carbide and cutting tool of sample 1-1 corresponds to a comparative example. The cutting tool of sample 1-1 was inferior in breakage resistance.

Heretofore, the embodiments and examples of the present disclosure have been illustrated, but it has been initially expected to appropriately combine the configurations of the embodiments and examples and modify them in various manners. The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1 cutting tool; 11 rake face; 12 flank face; 13 cutting edge.

The invention claimed is:

1. A cemented carbide comprising a first phase and a second phase, wherein
the first phase consists of a plurality of tungsten carbide grains,
a content ratio of the first phase of the cemented carbide is 65 volume % or more and 85 volume % or less,
a content ratio of the second phase of the cemented carbide is 4 volume % or more and 25 volume % or less,
the second phase includes 50 mass % or more of cobalt,
the second phase includes zirconium,
a cobalt content ratio $M_{Co}$ of the cemented carbide is 3 mass % or more and 15 mass % or less,
a and b of the cemented carbide indicate a relation of the following formula I:

$$b<0.0485a+0.0001 \qquad \text{Formula I, where}$$

the a represents a percentage, $(M_{Zr}/M_{Co})\times100$, of a zirconium content ratio $M_{Zr}$ of the cemented carbide in mass % with respect to the cobalt content ratio $M_{Co}$ of the cemented carbide in mass %,
the a is more than 0 and 8 or less,
the b represents an area percentage of pore in a first region of a cross section of the cemented carbide, and
the first region is a region located within a distance of 50 μm from a surface of the cemented carbide in the cross section.

2. The cemented carbide according to claim 1, wherein the a and the b indicate a relation of the following formula II:

$$b\leq0.0350a+0.0001 \qquad \text{Formula II.}$$

3. The cemented carbide according to claim 1, wherein the b is 0.0001 or more.

4. The cemented carbide according to claim 1, wherein the a is 0.0250 or more.

5. The cemented carbide according to claim 1, wherein
an area percentage of pore in a second region of the cross section of the cemented carbide is 0.01% or more and 0.40% or less, and
the second region is a region located beyond the distance of 50 μm from the surface of the cemented carbide toward an inner side of the cemented carbide in the cross section.

6. A cutting tool comprising the cemented carbide according to claim 1.

* * * * *